(12) United States Patent
Bates et al.

(10) Patent No.: US 12,447,909 B2
(45) Date of Patent: Oct. 21, 2025

(54) DRIVER-FACING CAMERA MOUNTING ASSEMBLY

(71) Applicant: Verizon Patent and Licensing Inc., Basking Ridge, NJ (US)

(72) Inventors: Mathew Bates, Dublin (IE); Moses Rowen, Dublin (IE); Eoin O'Donnell, Dublin (IE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 18/614,110

(22) Filed: Mar. 22, 2024

(65) Prior Publication Data

US 2025/0296514 A1    Sep. 25, 2025

(51) Int. Cl.
  *B60R 11/04*    (2006.01)
  *B60R 11/00*    (2006.01)
(52) U.S. Cl.
  CPC ....... *B60R 11/04* (2013.01); *B60R 2011/0063* (2013.01); *B60R 2011/0066* (2013.01)

(58) Field of Classification Search
None
See application file for complete search history.

(56) References Cited

U.S. PATENT DOCUMENTS

| 2022/0128889 A1* | 4/2022 | Kanitz | G02B 7/022 |
| 2023/0247271 A1* | 8/2023 | Mirchef | H04N 23/54 |
| | | | 348/148 |

* cited by examiner

*Primary Examiner* — Rebecca A Volentine (57) ABSTRACT

In some implementations, a mounting assembly may include a chassis having a platform portion, and a spine portion. The mounting assembly may include an end lock having a shaft portion engaged with the spine portion, and a cap portion configured to engage with a lock projection of a camera module, wherein the camera module is to be disposed between the platform portion and the cap portion. The mounting assembly may include a mount configured to mount the mounting assembly. The mounting assembly may include a swing arm pivotably coupled to the chassis by a first hinge, and pivotably coupled to the mount by a second hinge, where a first axis of rotation of the first hinge is orthogonal to a second axis of rotation of the second hinge.

20 Claims, 7 Drawing Sheets

DRIVER-FACING CAMERA MOUNTING ASSEMBLY

BACKGROUND

Driver-facing cameras (DFCs) can be used to provide monitoring within vehicles. In particular, a DFC may be positioned in a vehicle to capture images and/or videos of a driver as well as a surrounding cabin area. DFCs facilitate analysis of driver behavior, such as attentiveness, drowsiness, or distraction.

DETAILED DESCRIPTION OF EXAMPLE EMBODIMENTS

The following detailed description of example implementations refers to the accompanying drawings. The same reference numbers in different drawings may identify the same or similar elements.

DFCs are used in applications including vehicle safety systems, driver monitoring, and fleet management. Mounting systems for DFCs sometimes limit the camera's field of view (FOV) and lack adjustability, leading to blind spots in recorded footage and suboptimal camera aiming. Additionally, these mounting systems may fail to accommodate varying windshield angles and/or curvature (known as "rake"), further compromising the camera's effectiveness.

Some implementations described herein provide a DFC assembly that enables mounting with greater adjustability and freedom of movement for optimal camera aiming. The DFC assembly is configured to provide compensation for windshield rake, and is also configured to provide lateral angle adjustment to enhance side window capture. By enabling flexibility in camera positioning, the DFC assembly facilitates more useful image capture and analysis. Furthermore, by compensating for vehicle-specific geometries and windshield angles, the DFC assembly facilitates clear and robust image capture of a driver and a vehicle's interior environment.

Figure 1:
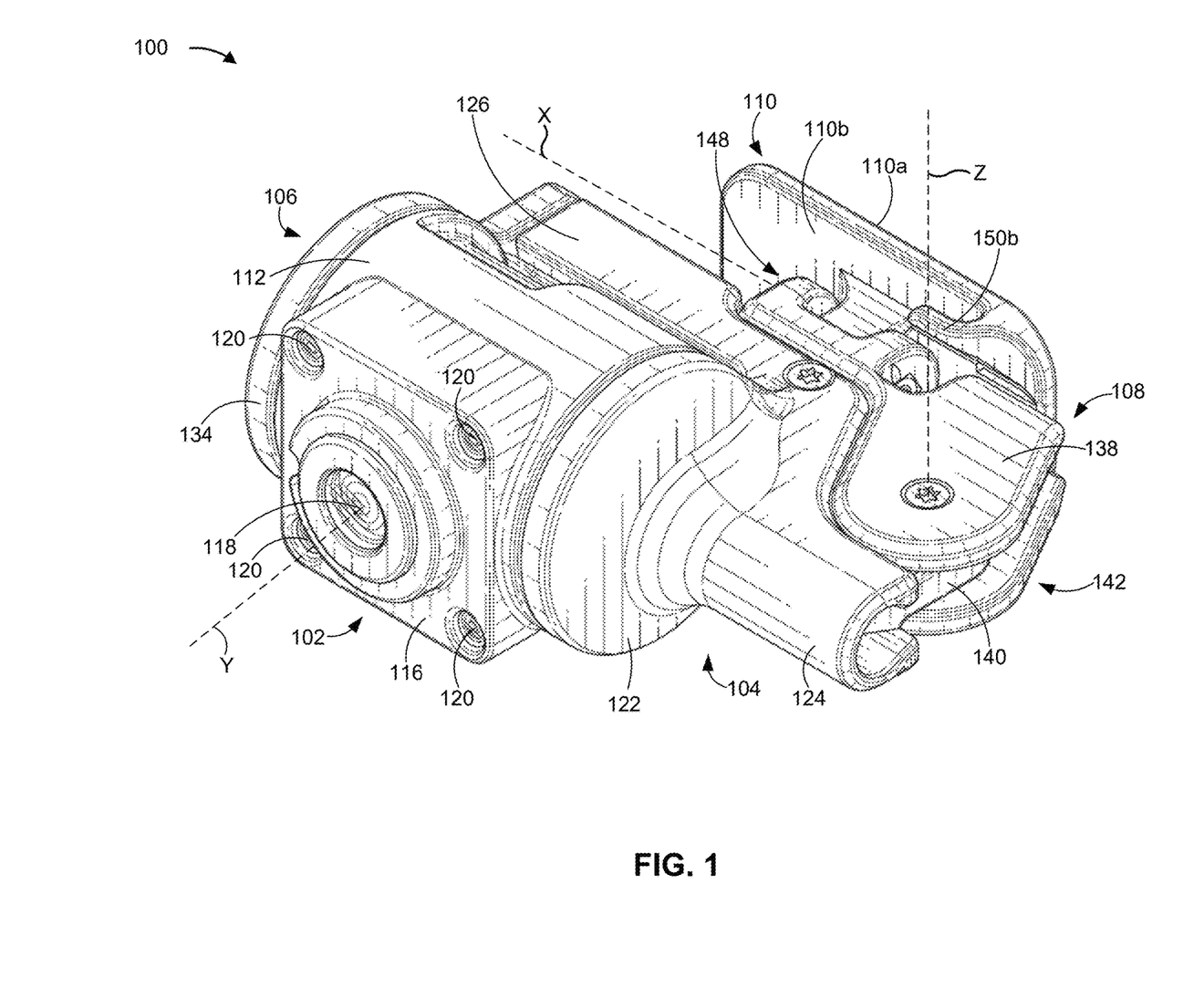
FIG. 1 is a perspective view of an example DFC assembly.
Figure 2:
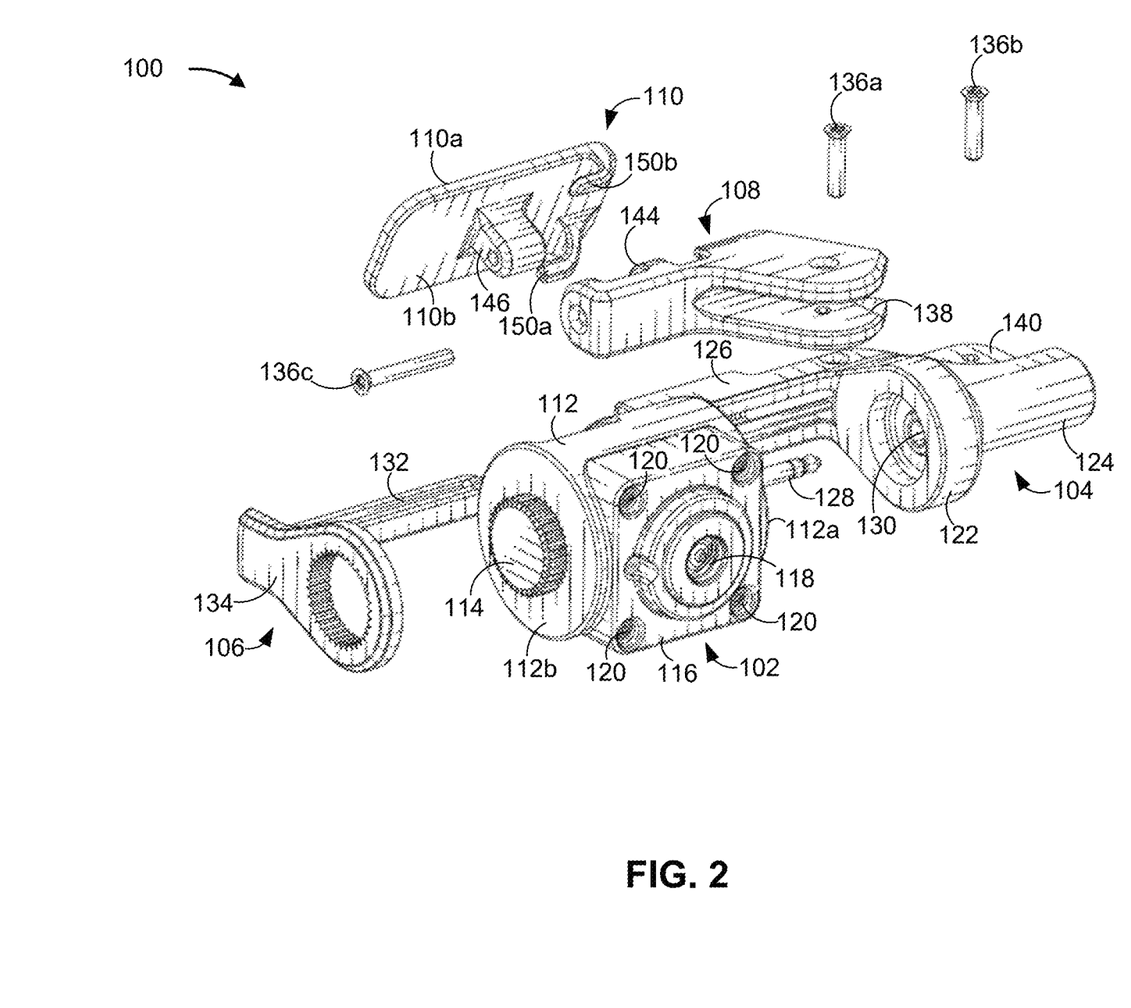
FIG. 2 is an exploded view of the DFC assembly of FIG. 1.

FIG. 1 is a perspective view of an example DFC assembly 100, and FIG. 2 is an exploded view of the DFC assembly 100 of FIG. 1. As shown, the DFC assembly 100 includes a camera module 102, a chassis 104, an end lock 106, a swing arm 108, and a mount 110 (e.g., a window mount). The chassis 104, the end lock 106, the swing arm 108, and/or the mount 110 may define a mounting assembly for the camera module 102.

The camera module 102 includes a housing 112 defining a side wall extending between a first end 112a and a second end 112b of the housing 112. As shown, the housing 112 may have an overall cylindrical shape, although in other implementations the housing 112 may take other shapes that also allow for rotation of the housing 112 (described below). A lock projection 114, configured to interconnect with the end lock 106, as described herein, may be disposed on the second end 112b of the housing. The lock projection 114 may have a plurality of splines (e.g., male splines), such as teeth, around a perimeter of the lock projection 114.

The housing 112 may include a camera mating region to receive a camera unit. In some implementations, the camera mating region is a recessed area located on a side wall of the housing 112. The camera mating region may include a connector (not shown) that mates with a connector on the camera unit and allows signals to be communicated to/from the camera unit. As shown, the camera mating region contains a camera block 116 which may include one or more cameras 118. As shown, a camera 118 (e.g., an opening in the camera block 116 aligned with an image sensor of the camera 118) may be centrally located in the camera block 116. In some implementations, one or more light emitters 120 may surround the camera 118. For example, as shown, four light emitters 120 may be positioned around the camera 118 at corners of the camera block 116. The light emitters 120 may include light-emitting diodes (LEDs), or the like. The light emitters 120 may be configured to emit visible light and/or infrared light, among other examples. In some implementations, the camera mating region may be configured to mate with an input device or output device other than a camera (e.g., the camera module 102 and the camera mating region may not necessarily relate to a camera).

The chassis 104 is attached to the camera module 102 and is configured to provide structural support for the camera module 102. The chassis 104 may include a platform portion 122 that supports (e.g., attaches to or engages with) the first end 112a of the housing 112 of the camera module 102. Accordingly, a maximum diameter of the platform portion 122 may correspond to a maximum diameter of the housing 112 (e.g., excluding the camera block 116) of the camera module 102. The platform portion 122 may taper, or otherwise reduce in diameter, to a stem portion 124 of the chassis 104. In addition, the chassis 104 may include a spine portion 126 that projects from the platform portion 122 and extends along the housing 112 of the camera module 102 in a direction from the first end 112a to the second end 112b of the housing 112 (e.g., on a side of the housing 112 opposite the camera block 116). In some implementations, the spine portion 126 may include a set of opposing rails configured to receive the end lock 106, as described herein.

In some implementations, the camera module 102 may be electrically and/or communicatively connected to the chassis 104. For example, the camera module 102 may include a connector 128 (e.g., that is electrically connected to circuitry of the camera module 102) that connects to a connector 130 of the chassis 104. As an example, the camera module 102 may include a jack (e.g., the connector 128), such as a 3.5 millimeter jack, that plugs into a port (e.g., the connector 130) in the platform portion 122 of the chassis 104.

The end lock 106 is configured to secure the camera module 102 to the chassis 104. The end lock 106 includes a shaft portion 132 and a cap portion 134 perpendicular to the shaft portion 132. The shaft portion 132 is engaged with the spine portion 126 of the chassis 104 (e.g., the shaft portion 132 extends along the housing 112 of the camera module 102 in a direction from the second end 112b to the first end 112a of the housing 112). For example, the shaft portion 132 may be disposed between (e.g., sandwiched between) rails of the set of opposing rails of the spine portion 126. In some examples, the spine portion 126 and the shaft portion 132 may include aligned apertures that receive a fastener 136a (e.g., a pin), thereby securing the shaft portion 132 to the spine portion 126.

The camera module 102 is disposed between the platform portion 122 of the housing 112 and the cap portion 134 of the end lock 106. The cap portion 134 is configured to engage with the lock projection 114 of the camera module 102. For example, the cap portion 134 may include an opening configured to fit around the lock projection 114. The opening may have a plurality of splines (e.g., female splines), such as teeth, around a perimeter of the opening. The splines of the opening may match with the splines of the lock projection 114 to form a spline joint that restricts lateral swiveling of the camera module 102. Furthermore, the spline joint between the end lock 106 and the camera module 102 facilitates fine tuning of an aim of the camera 118 in a vertical direction (e.g., if the camera 118 is aimed too high or too low when the DFC assembly 100 is attached to a vehicle's windshield). For example, the end lock 106 can be disengaged from the camera module 102 to allow an aim of the camera 118 to be adjusted, and then the end lock 106 can be re-engaged with the camera module 102.

The swing arm 108 may be configured to provide two-way pivoting interconnection between the chassis 104 and the mount 110. For example, the swing arm 108 may be configured to pivotably connect the swing arm 108 and the chassis 104, and to pivotably connect the swing arm 108 and the mount 110. In particular, the swing arm 108 may be pivotably coupled to the chassis 104 by a first hinge 142, and the swing arm 108 may be pivotably coupled to the mount 110 by a second hinge 148. The first hinge 142 may have a first axis of rotation (shown as axis Z), and the second hinge 148 may have a second axis of rotation (shown as axis X). The first axis of rotation may be orthogonal to the second axis of rotation. Furthermore, the first axis of rotation and the second axis of rotation may be orthogonal to an axis through the camera 118 (shown as axis Y).

A hinge element of the first hinge 142 may project from a first side of the swing arm 108 (e.g., in a first direction), and a hinge element of the second hinge 148 may project from a second side of the swing arm 108 opposite the first side (e.g., in a second direction opposite to the first direction). Additionally, the first hinge 142 may have an orientation that is rotated relative to an orientation of the second hinge 148 by an angle of approximately 90 degrees (e.g., the first axis of rotation and the second axis of rotation are orthogonal).

The swing arm 108 may include a hinge element 138 (referred to herein as a "lateral hinge element 138") that engages with a hinge element 140 of the chassis 104 to define the hinge 142. As an example, the lateral hinge element 138 may include a set of opposing tabs projecting from the swing arm 108, and the hinge element 140 may include a single tab projecting from the chassis 104 that is received between the set of opposing tabs (alternatively, the hinge element 140 may include the set of opposing tabs, and the lateral hinge element 138 may include the single tab). Moreover, the lateral hinge element 138 and the hinge element 140 may include aligned apertures that receive a fastener 136b (e.g., a pin), thereby rotationally securing the lateral hinge element 138 and the hinge element 140. The fastener 136b may define the first axis of rotation (axis Z). In some implementations, the set of opposing tabs projecting from the swing arm 108 may be rounded, and a transition of the platform portion 122 to the stem portion 124 may define a curve that matches the curvature of the set of opposing tabs, thereby allowing the swing arm 108 and the chassis 104 to pivot relative to each other.

The swing arm 108 and the chassis 104 may pivot in a manner that changes an angle between the swing arm 108 and the spine portion 126 of the chassis 104, which may be referred to as "lateral angle adjustment." For example, the lateral angle adjustment allows a viewing angle of the camera 118 to be increased or decreased relative to the perpendicular (e.g., a vertical plane) by adjusting a pivot of the swing arm 108. As an example, the lateral angle adjustment allows the camera module 102 and chassis 104 to be pivoted toward or away from a vehicle's windshield on which the DFC assembly 100 is mounted. When the DFC assembly 100 is mounted on a windshield of a vehicle, the lateral angle adjustment provides improved viewing angles of a vehicle's side window (e.g., where a view of the entire side window is desired). Furthermore, the lateral angle adjustment allows the DFC assembly 100 to be mounted anywhere on a vehicle's windshield without worsening views of a driver or other areas of interest in a vehicle's cabin. For example, the lateral angle adjustment can negate issues resulting from mounting the DFC assembly 100 to a vehicle's windshield offset from center.

The swing arm 108 may include a hinge element 144 (referred to herein as a "rake hinge element 144") that engages with a hinge element 146 of the mount 110 to define the hinge 148. As an example, the rake hinge element 144 may include a set of opposing tabs projecting from the swing arm 108, and the hinge element 146 may include a single tab projecting from the mount 110 that is received between the set of opposing tabs (alternatively, the hinge element 146 may include the set of opposing tabs, and the rake hinge element 144 may include the single tab). Moreover, the rake hinge element 144 and the hinge element 146 may include aligned apertures that receive a fastener 136c (e.g., a pin), thereby rotationally securing the rake hinge element 144 and the hinge element 146. The fastener 136c may define the second axis of rotation (axis X).

The swing arm 108 and the mount 110 may pivot in a manner that changes an angle between the swing arm 108 and the mount 110, which may be referred to as "rake compensation." The rake compensation allows the camera module 102 to swivel (e.g., vertically) to compensate for a rake angle of a vehicle's windshield, thereby improving vertical alignment with a driver or other areas of interest in a vehicle's cabin.

The mount 110 may be configured to provide mounting of the DFC assembly 100 to a surface, such as a windshield of a vehicle. The mount 110 may include a plate having a first surface 110a and a second surface 110b opposite the first surface 110a. A mounting element (e.g., an adhesive pad, a sticker, adhesive, or the like) may be attached to, or integrated into, the first surface 110a of the mount 110 to facilitate mounting of the DFC assembly 100. The hinge element 146 may project from the second surface 110b of the mount 110 (e.g., at a center of the mount 110).

Additionally, a first hook 150a and a second hook 150b may project from the second surface 110b of the mount 110. The hooks 150a, 150b are configured to guide a cable of the DFC assembly 100 (e.g., a cable electrically connected to the connector 130 of the chassis 104). The first hook 150a is spaced apart from the second hook 150b to define a gap. The swing arm 108 is positioned in the gap between the hooks 150a, 150b so that the first hook 150a and the second hook 150b are on opposite sides of the swing arm 108 (e.g., the hooks 150a, 150b are symmetrically above and below the swing arm 108). In this way, the cable can be routed either through the first hook 150*a* or the second hook 150*b* to support both left-hand driving and right-hand driving mounting orientations of the DFC assembly 100. In some implementations, the hooks 150*a*, 150*b* may include indentations configured to provide cable locking.

While described herein as a driver-facing camera, the DFC assembly 100 can be used for camera mounting and image capture in other non-driving-related applications.

As indicated above, FIGS. 1-2 are provided as an example. Other examples may differ from what is described with regard to FIGS. 1-2.

Figure 3:
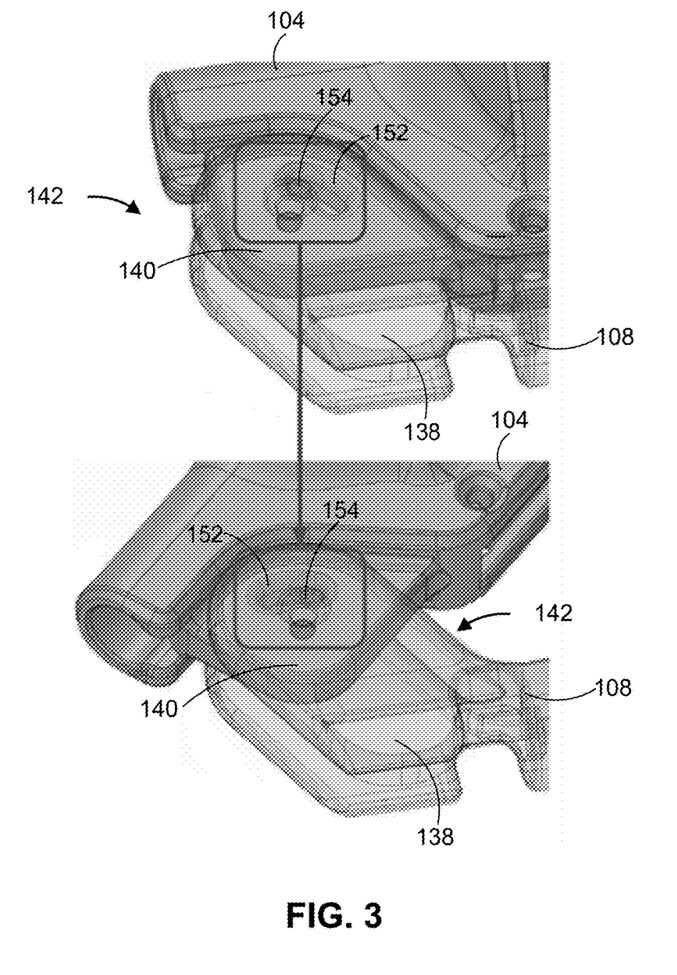
FIG. 3 is an enlarged and semi-transparent view of a hinge between a chassis and a swing arm of the DFC assembly of FIG. 1.

FIG. 3 is an enlarged and semi-transparent view of the hinge 142 between the chassis 104 and the swing arm 108. As shown, the hinge element 140 (e.g., the single tab projecting from the chassis 104) may include a channel 152. The lateral hinge element 138 (e.g., the set of opposing tabs projecting from the swing arm 108) may include one or more pins 154 (e.g., one pin 154 per tab) that project inward toward the hinge element 138 and slidably engage with the channel 152. The channel 152 may be curved to match a rotational motion of the hinge 142. A length of the channel 152 may be configured to dictate a maximum pivot angle and/or a minimum pivot angle between the chassis 104 and the swing arm 108 (e.g., to lock a lateral angle of the lateral angle adjustment at a maximum value, such as 45 degrees). In one example, the channel 152 may be configured to allow the camera module 102 to be positioned at any angle in a range from 0 degrees (shown by the top diagram of FIG. 3) to 45 degrees (shown by the bottom diagram of FIG. 3) from the perpendicular.

As indicated above, FIG. 3 is provided as an example. Other examples may differ from what is described with regard to FIG. 3.

Figure 4:
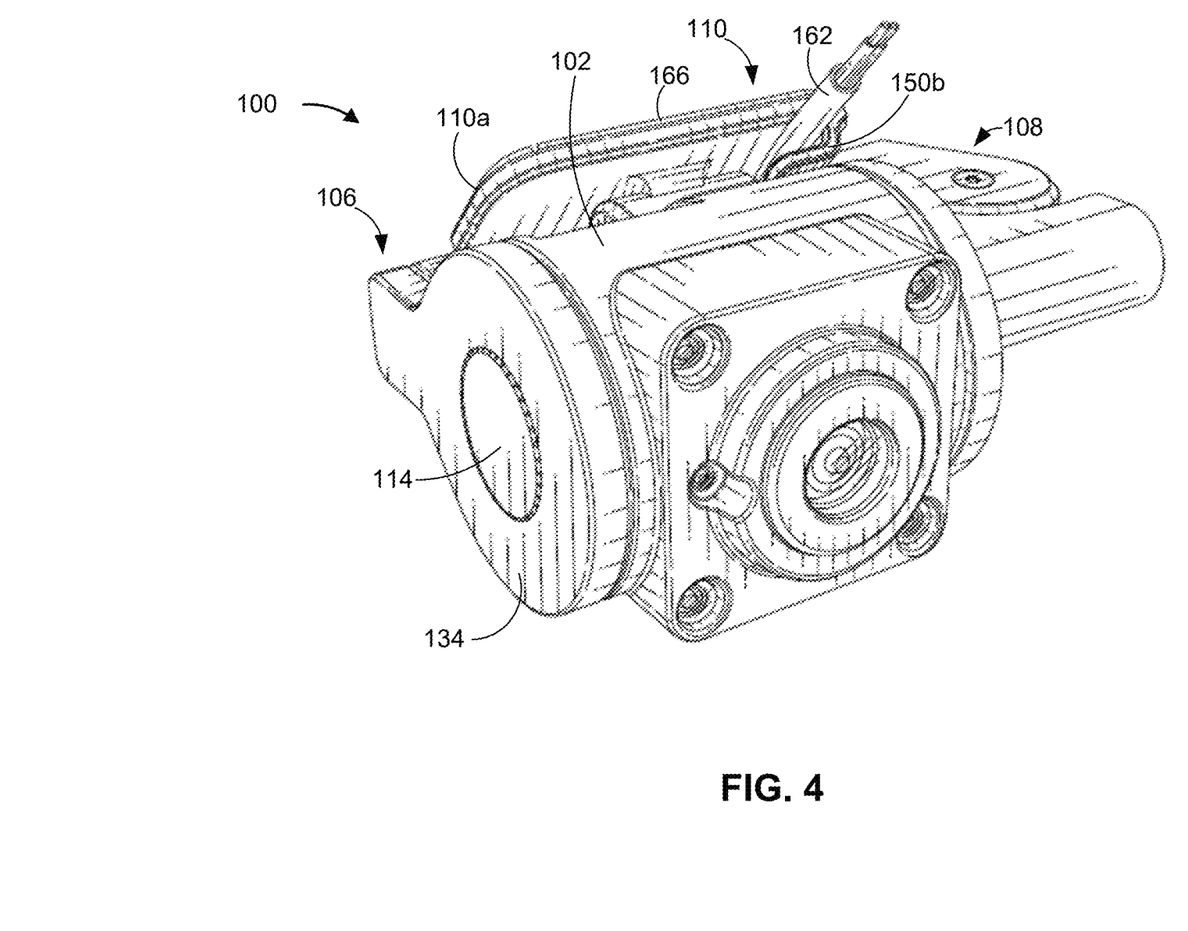
FIG. 4 is a perspective view of the DFC assembly of FIG. 1.

FIG. 4 is a perspective view of the DFC assembly 100. FIG. 4 shows the engagement of the cap portion 134 of the end lock 106 with the lock projection 114 of the camera module 102. FIG. 4 also shows a cable 162 guided through the second hook 150*b* so that the cable 162 extends toward a top of the DFC assembly 100. As further shown, an adhesive pad 166 may be attached to the first surface 110*a* of the mount 110 to facilitate mounting of the DFC assembly 100 (e.g., to a vehicle's windshield).

As indicated above, FIG. 4 is provided as an example. Other examples may differ from what is described with regard to FIG. 4.

Figure 5:
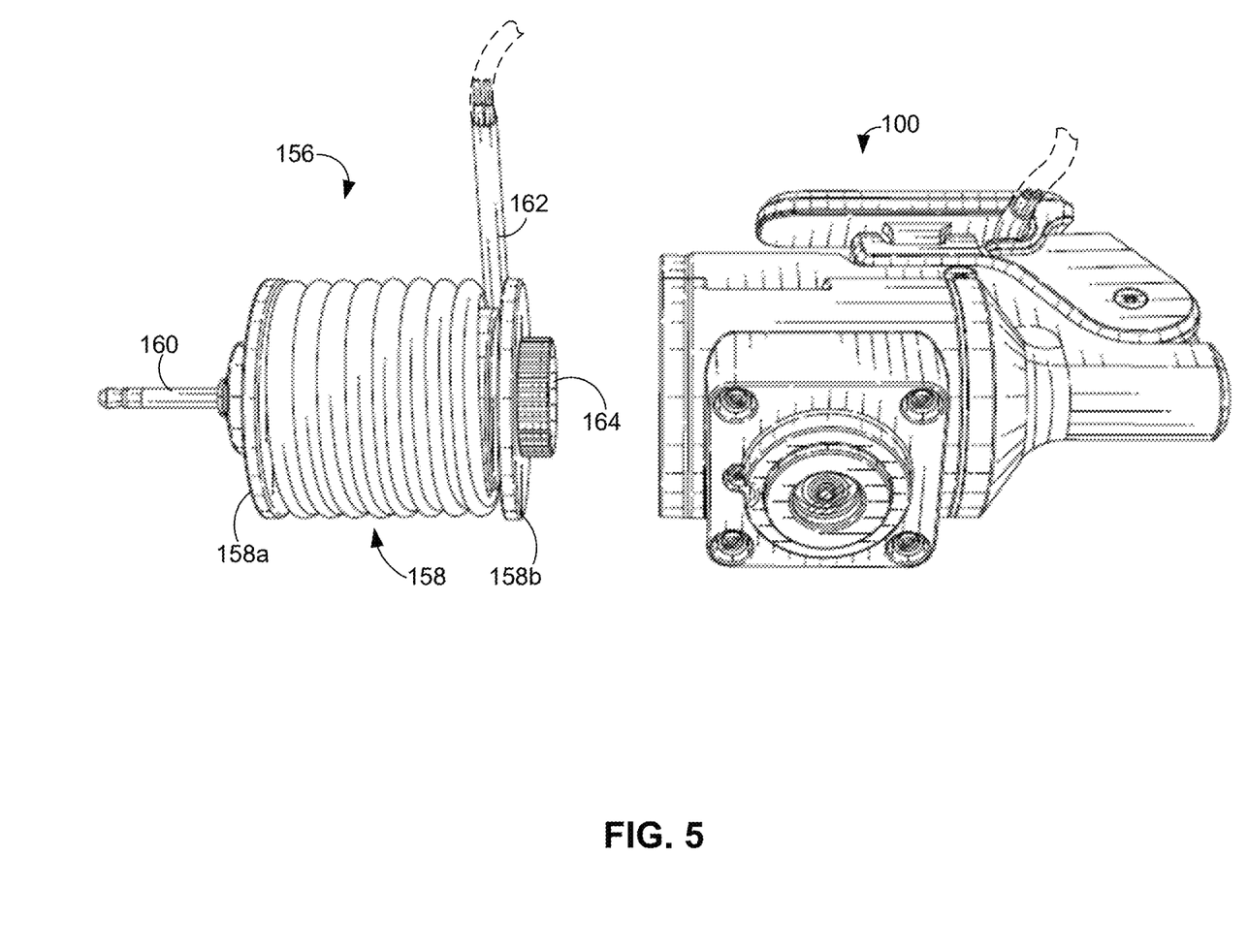
FIG. 5 is a perspective view of an example cable spool.

FIG. 5 is a perspective view of an example cable spool 156. The cable spool 156 includes a spool body 158 having a first end 158*a* (e.g., a first flange) and a second end 158*b* (e.g., a second flange). The cable spool 156 may include a connector 160 (e.g., a jack, such as a 3.5 millimeter jack) that projects from the first end 158*a* of the spool body 158, and that is electrically connected to the cable 162 (e.g., stereo cable) that is wound around the spool body 158. The cable 162 may have a length in a range from 5 centimeters to 75 centimeters.

The cable spool 156 may be used with the DFC assembly 100. For example, the cable spool 156 may connect to a telematics device (not shown), via the connector 160, and may communicatively connect the telematics device to the DFC assembly 100. As an example, the cable spool 156 may be configured to plug into a cavity in the telematics device. The second end 158*b* of the cable spool 156 may include a lock projection 164 (similar to the lock projection 114) that is configured to lock into the telematics device to prevent cable unraveling. For example, the lock projection 164 may include male splines that engage with female splines of the telematics device.

As indicated above, FIG. 5 is provided as an example. Other examples may differ from what is described with regard to FIG. 5.

Figure 6:
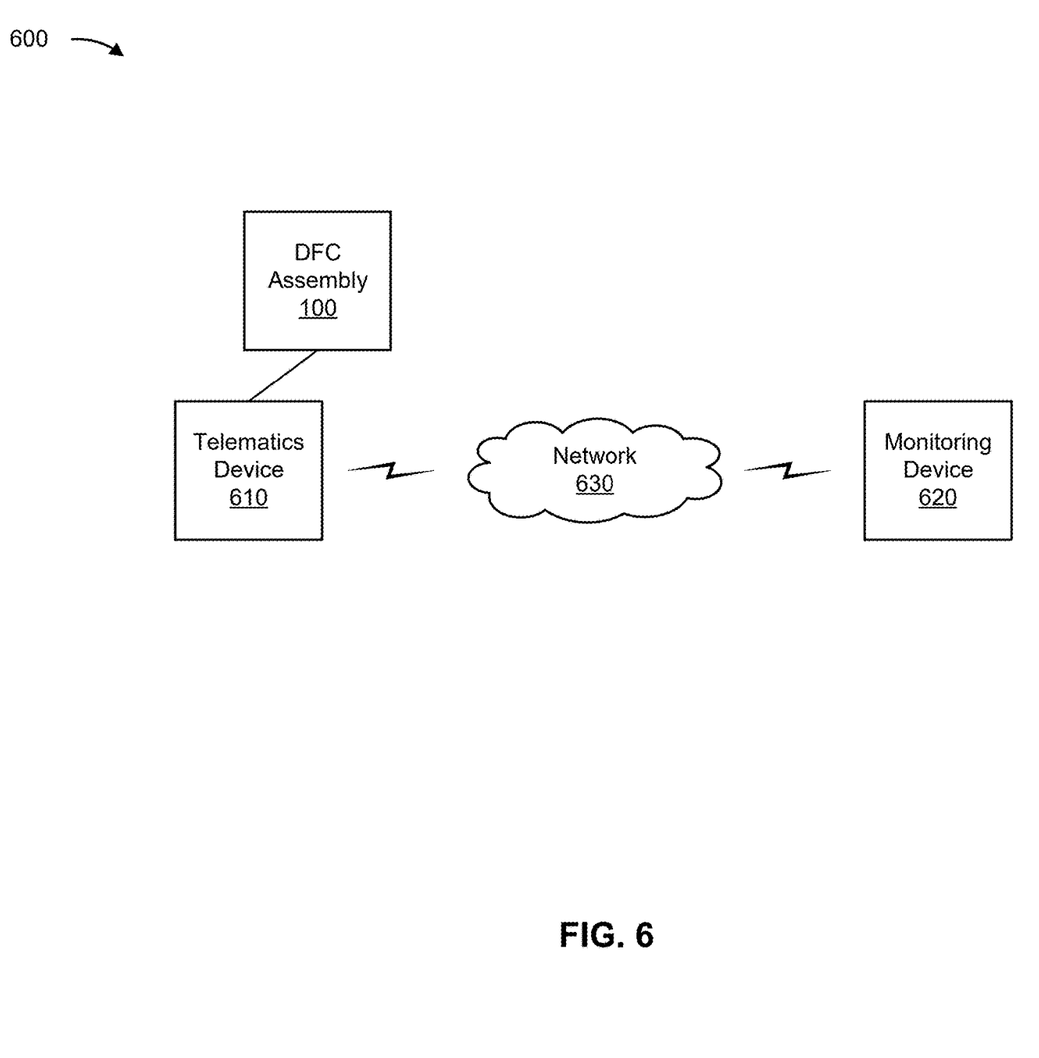
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include the DFC assembly 100, a telematics device 610, a monitoring device 620, and a network 630. Devices of environment 600 may interconnect via wired connections, wireless connections, or a combination of wired and wireless connections.

The telematics device 610 may include one or more devices capable of receiving, generating, storing, processing, and/or providing information associated with image data captured by the DFC assembly 100, as described elsewhere herein. The telematics device 610 may include a communication device and/or a computing device. For example, the telematics device 610 may include a wireless communication device, a user equipment, a cellular modem, or a similar type of device. The telematics device 610 may be mounted in a vehicle (e.g., on the vehicle's windshield) in which the DFC assembly 100 is also mounted. The DFC assembly 100 may be communicatively connected to the telematics device 610 via a wired connection (e.g., using cable spool 156) or a wireless connection. In some implementations, the telematics device 610 may include a forward-facing camera (e.g., a camera configured to face a roadway or other environment where the vehicle is located).

The monitoring device 620 may include one or more devices capable of receiving, generating, storing, processing, and/or providing information associated with image data captured by the DFC assembly 100, as described elsewhere herein. For example, image data captured by the DFC assembly 100 may be communicated to the telematics device 610, the telematics device 610 may transmit the image data for the monitoring device 620, and the monitoring device 620 may store the image data, process the image data, and/or display the image data. The monitoring device 620 may include a communication device and/or a computing device. For example, the monitoring device 620 may include a mobile phone, a laptop computer, a tablet computer, a desktop computer, or a similar type of device. Additionally, or alternatively, the monitoring device 620 may include a server, such as an application server, a client server, a web server, a database server, a host server, a proxy server, a virtual server (e.g., executing on computing hardware), or a server in a cloud computing system.

The network 630 may include one or more wired and/or wireless networks. For example, the network 630 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 630 enables communication among the devices of environment 600.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
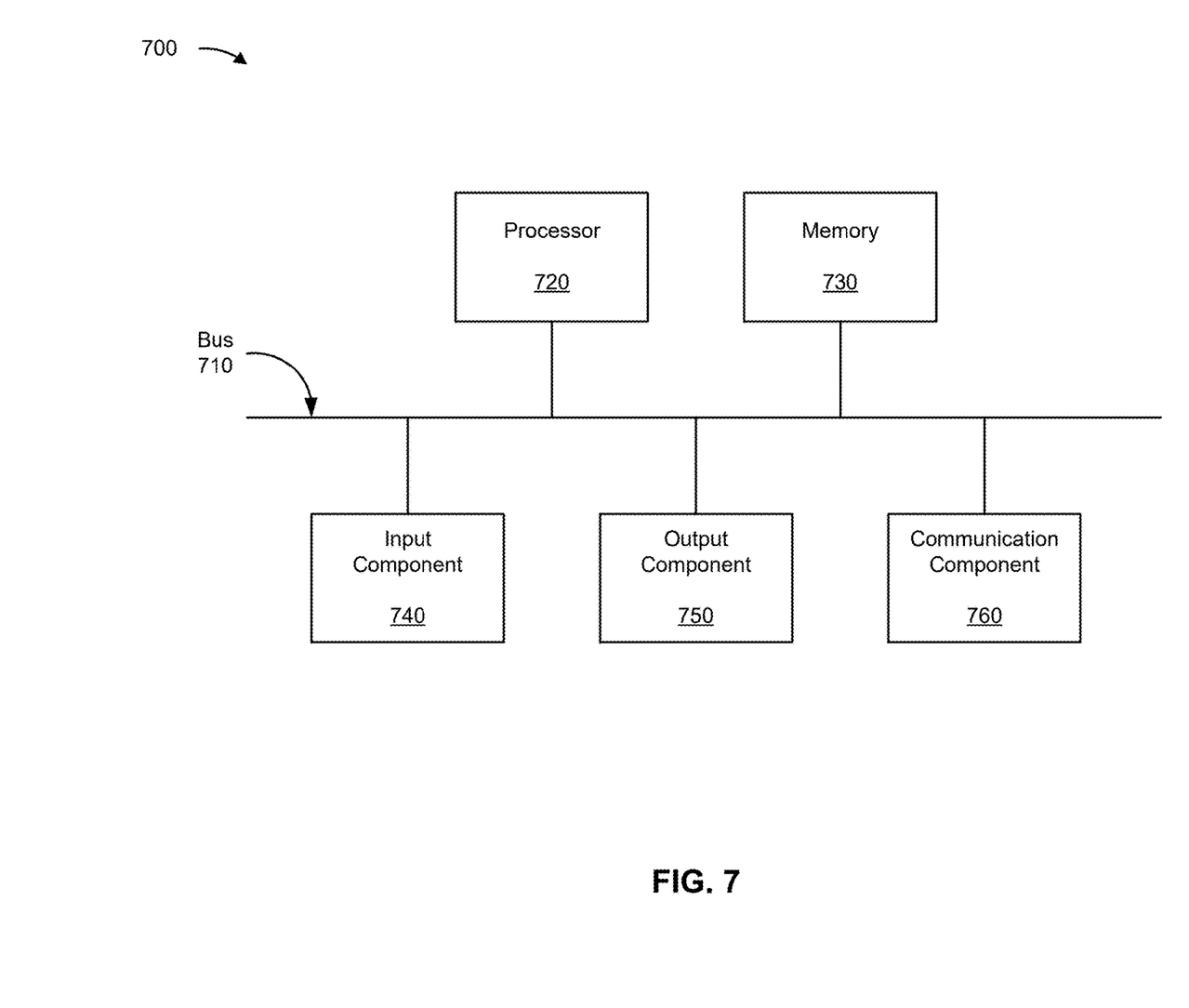
FIG. 7 is a diagram of example components of a device.

FIG. 7 is a diagram of example components of a device 700. The device 700 may correspond to the DFC assembly 100 (e.g., the camera module 102 and/or the camera 118), the telematics device 610, and/or the monitoring device 620. In some implementations, the DFC assembly 100 (e.g., the camera module 102 and/or the camera 118), the telematics device 610, and/or the monitoring device 620 may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A camera assembly, comprising:
   a camera module comprising:
      a housing defining a side wall extending between a first end and a second end of the housing,
      a camera mating region in the housing to receive a camera unit, and
      a lock projection on the second end of the housing;
   a chassis comprising:
      a platform portion supporting the first end of the housing, and
      a spine portion that extends along the housing in a direction from the first end to the second end of the housing;
   an end lock comprising:
      a shaft portion engaged with the spine portion of the chassis, and
      a cap portion perpendicular to the shaft portion and engaged with the lock projection;
   a mount; and
   a swing arm pivotably coupled to the chassis by a first hinge, and pivotably coupled to the mount by a second hinge,
      wherein a first axis of rotation of the first hinge is orthogonal to a second axis of rotation of the second hinge.

2. The camera assembly of claim 1, wherein the first axis of rotation and the second axis of rotation are orthogonal to an axis through the camera mounting region.

3. The camera assembly of claim 1, wherein the spine portion of the chassis comprises a set of opposing rails, and
   wherein the shaft portion of the end lock is disposed between rails of the set of opposing rails.

4. The camera assembly of claim 1, wherein the lock projection of the camera module has a first plurality of splines, and
   wherein an opening in the cap portion of the end lock has a second plurality of splines engaged with the first plurality of splines.

5. The camera assembly of claim 1, wherein a hinge element of the first hinge projects from a first side of the swing arm, and a hinge element of the second hinge projects from a second side of the swing arm opposite the first side.

6. The camera assembly of claim 1, wherein the housing comprises a camera block disposed in the camera mating region, and
   wherein the camera block includes a camera.

7. The camera assembly of claim 1, wherein the mount comprises a first hook and a second hook, and the swing arm is between the first hook and the second hook.

8. The camera assembly of claim 1, wherein the mount comprises an adhesive pad.

9. A mounting assembly for a camera module, comprising:
   a chassis comprising:
      a platform portion configured to support a first end of a housing of the camera module, and
      a spine portion configured to extend along the housing in a direction from the first end to a second end of the housing;
   an end lock comprising:
      a shaft portion engaged with the spine portion of the chassis, and
      a cap portion perpendicular to the shaft portion and configured to engage with a lock projection on the second end of the housing;
   a mount; and
   a swing arm pivotably coupled to the chassis by a first hinge, and pivotably coupled to the mount by a second hinge,
      wherein a first axis of rotation of the first hinge is orthogonal to a second axis of rotation of the second hinge.

10. The mounting assembly of claim 9, wherein the spine portion of the chassis comprises a set of opposing rails, and
    wherein the shaft portion of the end lock is disposed between rails of the set of opposing rails.

11. The mounting assembly of claim 9, wherein an opening in the cap portion of the end lock has a first plurality of splines configured to engage with a second plurality of splines of the lock projection.

12. The mounting assembly of claim 9, wherein a hinge element of the first hinge projects from a first side of the swing arm, and a hinge element of the second hinge projects from a second side of the swing arm opposite the first side.

13. The mounting assembly of claim 9, wherein the mount comprises a first hook and a second hook, and the swing arm is between the first hook and the second hook.

14. A mounting assembly, comprising:
a chassis comprising:
  a platform portion, and
  a spine portion projecting from the platform portion;
an end lock comprising:
  a shaft portion engaged with the spine portion of the chassis, and
  a cap portion perpendicular to the shaft portion and configured to engage with a lock projection of a camera module,
    wherein the camera module is to be disposed between the platform portion of the chassis and the cap portion of the end lock;
a mount configured to mount the mounting assembly to a surface; and
a swing arm pivotably coupled to the chassis by a first hinge, and pivotably coupled to the mount by a second hinge,
  wherein a first axis of rotation of the first hinge is orthogonal to a second axis of rotation of the second hinge.

15. The mounting assembly of claim 14, wherein the first axis of rotation and the second axis of rotation are orthogonal to an axis through a camera of the camera module.

16. The mounting assembly of claim 14, wherein the spine portion of the chassis comprises a set of opposing rails, and
  wherein the shaft portion of the end lock is disposed between rails of the set of opposing rails.

17. The mounting assembly of claim 14, wherein an opening in the cap portion of the end lock has a first plurality of splines configured to engage with a second plurality of splines of the lock projection.

18. The mounting assembly of claim 14, wherein a hinge element of the first hinge projects from a first side of the swing arm, and a hinge element of the second hinge projects from a second side of the swing arm opposite the first side.

19. The mounting assembly of claim 14, wherein the mount comprises a first hook and a second hook, and the swing arm is between the first hook and the second hook.

20. The mounting assembly of claim 14, wherein the mount comprises an adhesive pad.

* * * * *